US010501109B2

United States Patent
Kato

(10) Patent No.: US 10,501,109 B2
(45) Date of Patent: Dec. 10, 2019

(54) STEERING APPARATUS FOR VEHICLE

(71) Applicant: AISIN SEIKI KABUSHIKI KAISHA, Kariya-shi, Aichi-ken (JP)

(72) Inventor: Ken Kato, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 111 days.

(21) Appl. No.: 15/820,634

(22) Filed: Nov. 22, 2017

(65) Prior Publication Data
US 2018/0141581 A1    May 24, 2018

(30) Foreign Application Priority Data

Nov. 24, 2016    (JP) .................................. 2016-227412

(51) Int. Cl.
| | |
|---|---|
| *B62D 1/181* | (2006.01) |
| *B62D 1/185* | (2006.01) |
| *B62D 1/189* | (2006.01) |
| *F16H 1/20* | (2006.01) |
| *F16H 25/20* | (2006.01) |

(52) U.S. Cl.
CPC ............. *B62D 1/181* (2013.01); *B62D 1/185* (2013.01); *B62D 1/189* (2013.01); *F16H 1/203* (2013.01); *F16H 25/20* (2013.01); *F16H 2025/209* (2013.01); *F16H 2025/2043* (2013.01)

(58) Field of Classification Search
CPC ........ B62D 1/181; B62D 1/185; B62D 1/189; F16H 1/203; F16H 25/20; F16H 2025/2043; F16H 2025/209
See application file for complete search history.

(56) References Cited

U.S. PATENT DOCUMENTS

| | | | |
|---|---|---|---|
| 8,161,839 B2 | 4/2012 | Warashina | |
| 8,434,788 B2 * | 5/2013 | Becker | ................... B62D 1/192 280/775 |

FOREIGN PATENT DOCUMENTS

JP    2009-096409 A    5/2009

* cited by examiner

*Primary Examiner* — Thomas C Diaz
(74) *Attorney, Agent, or Firm* — Buchanan Ingersoll & Rooney PC

(57) ABSTRACT

A steering apparatus for a vehicle includes at least one of an electric telescopic mechanism driving a steering wheel provided at a steering shaft and an electric tilt mechanism driving the steering wheel. The one of the electric telescopic mechanism and the electric tilt mechanism includes an electric motor, a threaded shaft connected to an output shaft of the electric motor, and a speed reduction mechanism. The speed reduction mechanism includes a worm gear, a screw gear, an idle gear meshing with the screw gear and the worm gear. The output shaft and the threaded shaft are connected to each other such that at least one of a relationship of parallelism, a relationship of inclination and a relationship of skew is established.

2 Claims, 5 Drawing Sheets

STEERING APPARATUS FOR VEHICLE

CROSS REFERENCE TO RELATED APPLICATIONS

This application is based on and claims priority under 35 U.S.C. § 119 to Japanese Patent Application 2016-227412, filed on Nov. 24, 2016, the entire content of which is incorporated herein by reference.

TECHNICAL FIELD

This disclosure generally relates to a steering apparatus for a vehicle.

BACKGROUND DISCUSSION

For example, JP2009-96409A (which will be hereinafter referred to as Patent reference 1) discloses a known electric tilt steering apparatus at which an output shaft of an electric motor and a tilt screw shaft are arranged to be parallel with each other. The output shaft of the electric motor and the tilt screw shaft are connected to each other via a speed reduction device. As the speed reduction device, a worm and a worm wheel are used. In an embodiment of Patent reference 1, it is described that a worm and a worm wheel, which serve as a motor speed reduction device and which are not shown, are accommodated inside a motor case. It is also described in Patent reference 1 that a movable nut member is screw-joined to a tilt screw in a state where the tilt screw is put into or screwed into the movable nut member, and a lower portion of a swing arm is connected to the movable nut member via a link mechanism (which are described in paragraphs [0028] and [0029] of Patent reference 1, however, figure numbers and reference numerals are omitted).

Further, it is described in Patent reference 1 that the other end of a telescopic screw is rotatably supported by a lower surface of an upper jacket via a bracket that will be described below, and that a motor is connected to the other end of the telescopic screw via a worm and a worm wheel which are not shown (which is described in paragraph [0032] of Patent reference 1, however, figure numbers and reference numerals are omitted). Thus, the known steering apparatus also includes a telescopic mechanism at which an output shaft of the motor and a telescopic screw shaft are arranged to be parallel with each other. The worm and the worm wheel are used as the speed reduction device of the output shaft and the telescopic screw shaft.

Generally, at a steering apparatus including an electric telescopic mechanism and/or an electric tilt mechanism, a threaded shaft provided with trapezoidal screw threads is used as the tilt screw shaft and/or the telescopic screw shaft which are described above. Generally, a worm speed reduction mechanism such as the speed reduction device described in Patent reference 1 is used as a speed reduction device of an electric motor output to the threaded shaft. In the worm speed reduction mechanism, a space portion is needed for the electric motor to be arranged in a direction perpendicular to the threaded shaft and the electric motor is arranged in a manner that the electric motor projects from a steering column. Accordingly, not only the entire apparatus inevitably increases in size but also it may be difficult for the apparatus to be mounted on a vehicle. On the other hand, as illustrated in FIGS. 8 and 9, according to some known apparatus, the output shaft of the electric motor is arranged to be parallel with the threaded shaft by interposing, for example, a spur gear between the threaded shaft and the worm speed reduction mechanism. However, the increment in size of the entire apparatus is inevitable, and the number of parts and components increases, thereby contributing to cost increment.

As described above, on the premise that the output shaft of the electric motor includes either a relationship of orthogonality or a relationship of parallelism relative to the threaded shaft, the electric telescopic mechanism and/or the electric tilt mechanism are not only required to be small in size and be light, but also required to be easily arranged. In such a circumstance, a further reduction in size and space-saving are enabled by a configuration in which the threaded shaft and the output shaft of the electric motor are connectable to each other with any of the relationship of parallelism, a relationship of inclination where an angle is provided between both of the shafts (accordingly, including the orthogonality) and a relationship of skew where the both shafts do not intersect each other.

A need thus exists for a steering apparatus for a vehicle, which is not susceptible to the drawbacks mentioned above.

SUMMARY

According to an aspect of this disclosure, a steering apparatus for a vehicle includes at least one of an electric telescopic mechanism driving a steering wheel provided at a steering shaft such that the steering wheel moves in a front and rear direction relative to a vehicle body, and an electric tilt mechanism driving the steering wheel in an upper and lower direction. The one of the electric telescopic mechanism and the electric tilt mechanism includes an electric motor supported by the steering shaft, a threaded shaft connected to an output shaft of the electric motor, a speed reduction mechanism decelerating rotation of the threaded shaft relative to rotation of the output shaft. The speed reduction mechanism includes a worm gear provided at the output shaft, a screw gear provided at the threaded shaft, an idle gear including a screw tooth meshing with the screw gear and the worm gear, and the output shaft and the threaded shaft being connected to each other via the idle gear such that at least one of a relationship of parallelism, a relationship of inclination and a relationship of skew is established between the output shaft and the threaded shaft.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
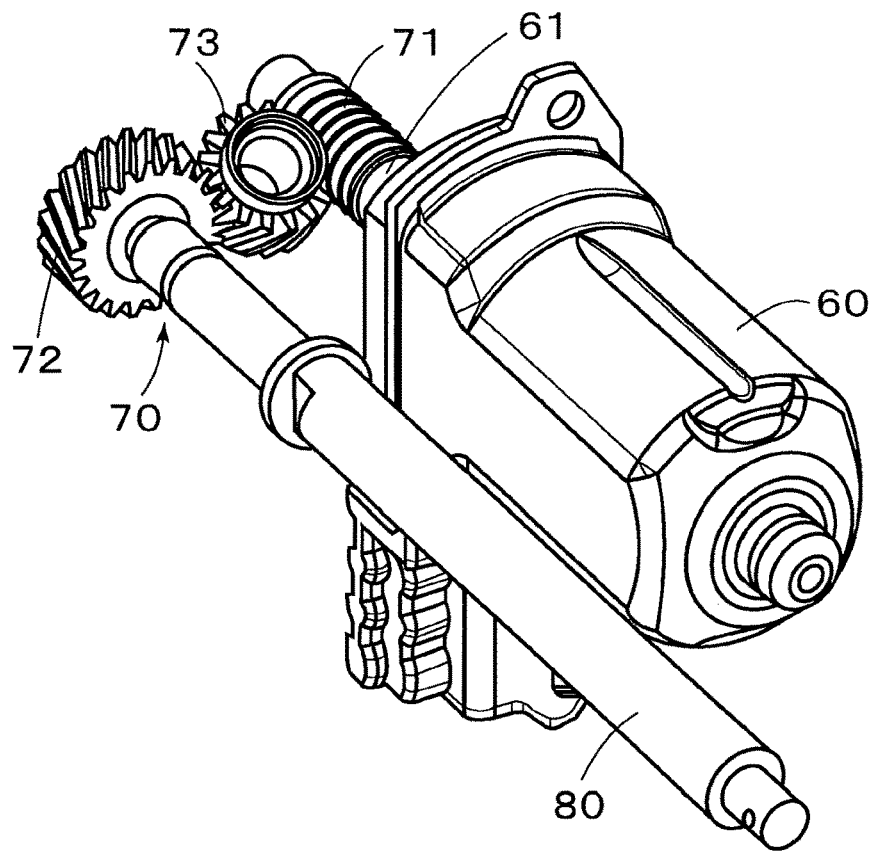
FIG. 1 is a perspective view illustrating a first embodiment of a speed reduction mechanism provided at a steering apparatus disclosed here.
Figure 2:
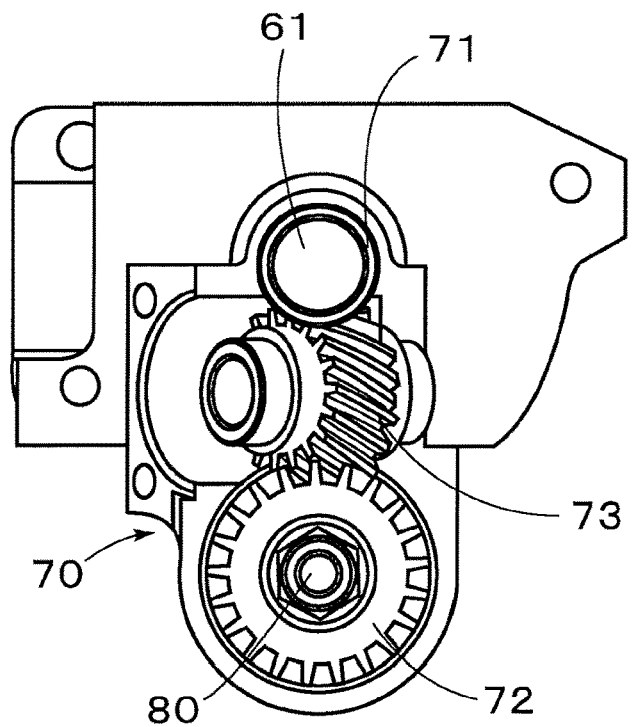
FIG. 2 is a front view illustrating a part of the speed reduction mechanism of the first embodiment disclosed here.
Figure 3:
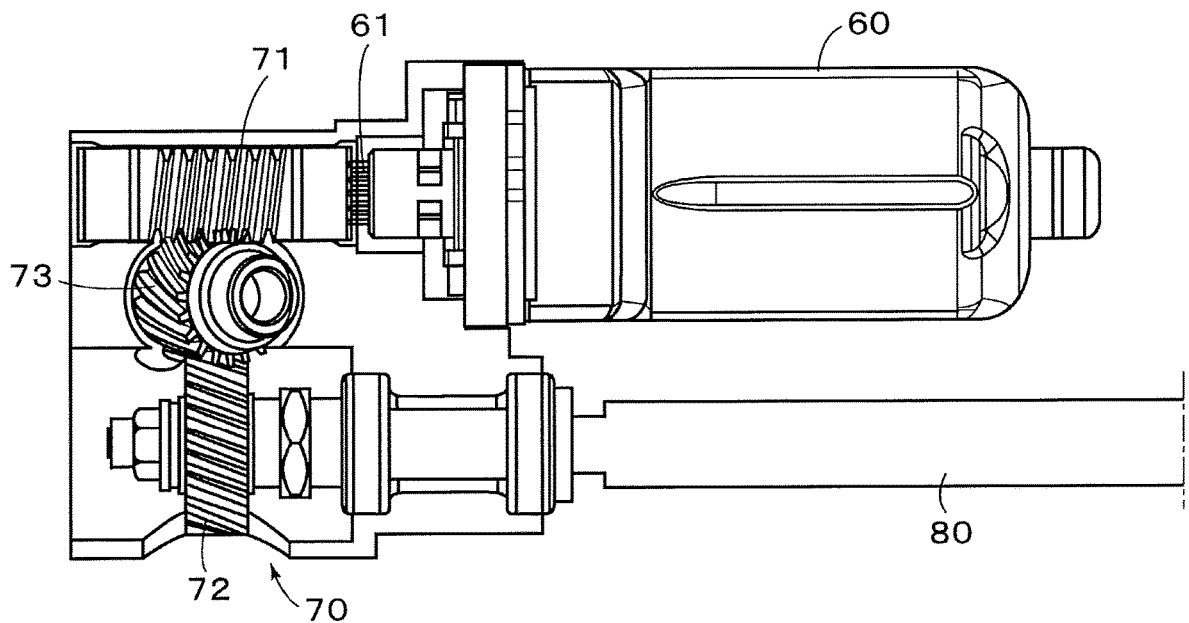
FIG. 3 is a plan view illustrating a part of the speed reduction mechanism of the first embodiment disclosed here.
Figure 4:
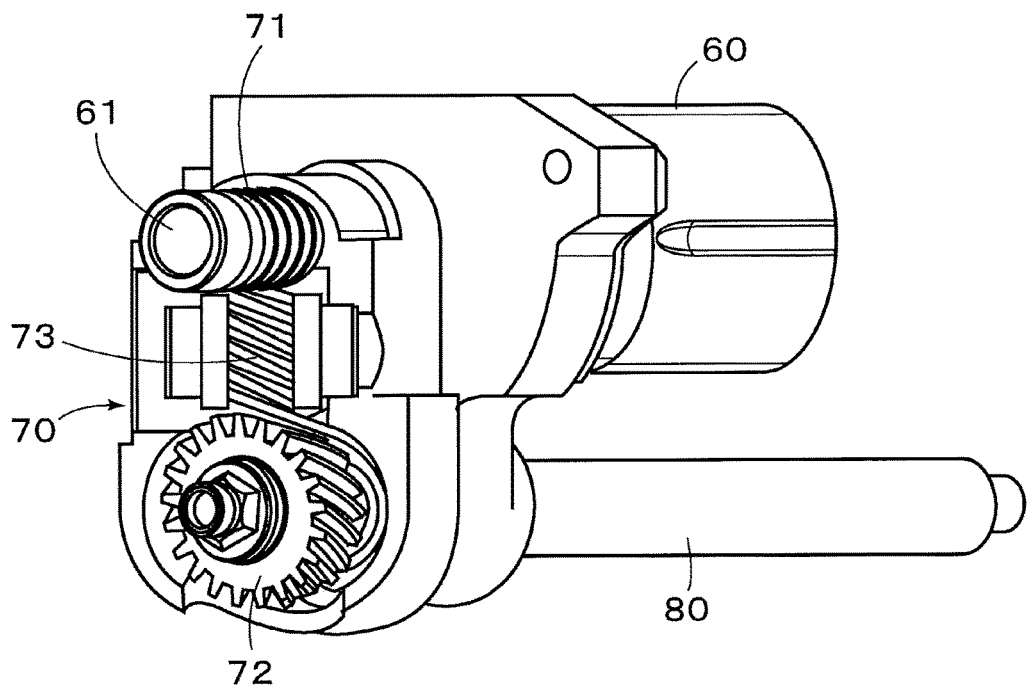
FIG. 4 is a side view of the speed reduction mechanism of the first embodiment, which is viewed on a surface that is parallel with an axis of an idle gear.
Figure 5:
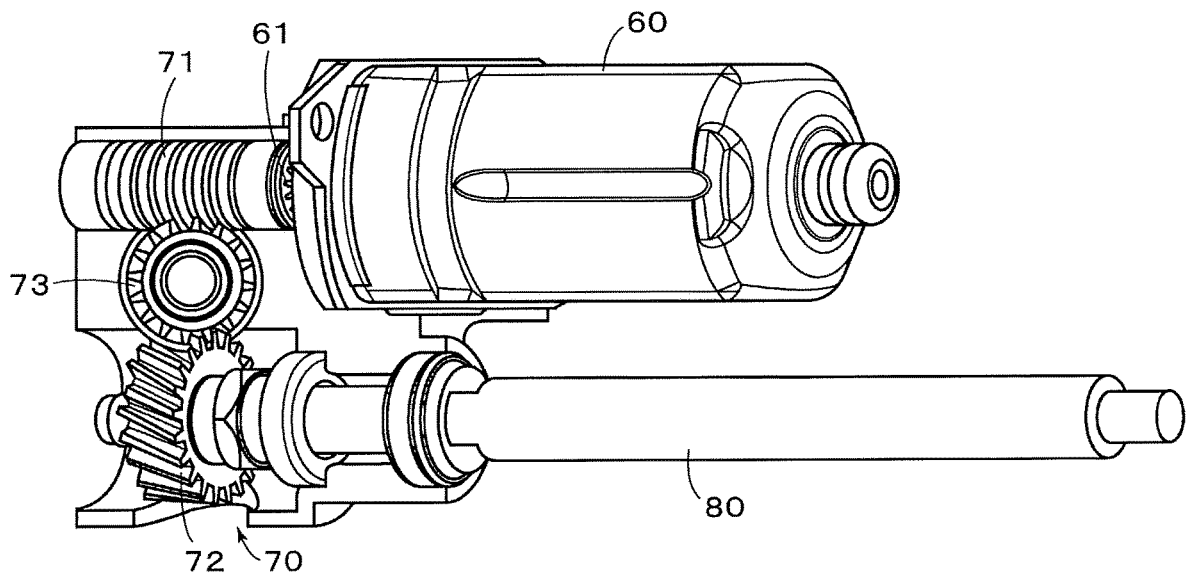
FIG. 5 is a side view of the speed reduction mechanism of the first embodiment, which is viewed in an axial direction of the idle gear.

A first embodiment of the present disclosure will be described with reference to the drawings. First, the entire configuration of a steering apparatus related to the present disclosure will be described with reference to FIG. 7. A steering shaft 1 includes an upper shaft 1a including a cylindrical shape and a lower shaft 11b. A steering wheel W is connected a rear end portion of the upper shaft 1a. The lower shaft 1b is connected to a front end portion of the upper shaft 1a with spline-connection. That is, the upper shaft 1a and the lower shaft 1b are joined to each other to be movable relative to each other in an axial direction. A front end portion of the lower shaft 1b is connected to a steering mechanism. The steering mechanism is configured to be driven in accordance with an operation of the steering wheel W and to steer a steered wheel via a wheel steering mechanism.

A main housing 10 is arranged to be coaxial with the steering shaft 1. The main housing 10 is supported to be able to pivot or swing about a swing center C relative to a vehicle body B, and is held by a fixing bracket 30. The fixing bracket 30 includes holding portions 31 provided as a pair to face each other and extending towards a lower side of the vehicle (In FIG. 7, one of the holding portions 31 is shown). The main housing 10 is held between the holding portions 31 and is fixed to the vehicle body B at the upper side of FIG. 7. Further, a push mechanism is interposed between each of the holding portions 31 of the fixing bracket 30 and the main housing 10, and thus the main housing 10 is pushed and held in a slidable manner.

A movable column member 20 is supported inside the main housing 10 to be movable in the axial direction, that is, to be movable in a front and rear direction of the vehicle body. An inner tube 21 and an outer tube 22 are provided to form the movable column member 20. The inner tube 21 accommodates and supports the steering shaft 1 such that the steering shaft 1 is rotatable about an axis. The outer tube 22 accommodates the inner tube 21 and normally holds the inner tube 21 at a predetermined position. The upper shaft 1a is rotatably supported by a rear end portion of the inner tube 21 via a bearing. However, a relative movement between the upper shaft 1 and the inner tube 21 in the axial direction is restricted, and the upper shaft 1a and the inner tube 21 are configured to be movable in the axial direction integrally with each other.

As described above, the outer tube 22, the inner tube 21, the steering shaft 1 and the steering wheel W are movable in the axial direction integrally with one another relative to the main housing 10, thereby forming an electric telescopic mechanism including a drive mechanism. Accordingly, the steering wheel W is adjustable at a desired position in the front and rear direction of the vehicle body. Further, it is configured such that the inner tube 21 is allowed to move in the axial direction (eventually, the upper shaft 1a is allowed to move in the axial direction) relative to the outer tube 22 when a load that is equal to or greater than a predetermined value is applied to the steering shaft 1. The inner tube 21 and the outer tube 22 of the present embodiment function as an energy absorption device together with, for example, a friction material including an annular shape and interposed between the inner tube 21 and the outer tube 22.

Figure 7:
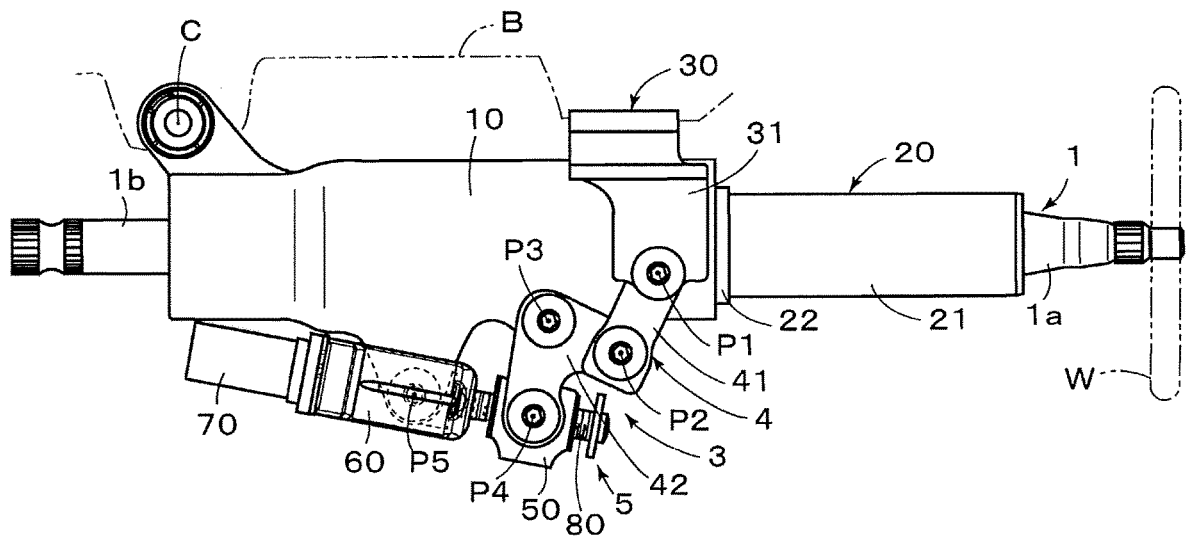
FIG. 7 is a side view illustrating the entire configuration of the steering apparatus disclosed here.

One end of a link mechanism 4 is supported by the fixing bracket 30 and another end of the link mechanism 4 is connected to a drive mechanism 5. The drive mechanism 5 is supported by the main housing 10 to be able to swing or pivot. Due to the drive mechanism 5, the movable column member 20 is able to swing or pivot relative to the vehicle body via the link mechanism 4, and thus an electric tilt mechanism 3 is configured. Accordingly, the steering wheel W is adjustable at a desired position in an upper and lower direction of the vehicle body. As illustrated in FIG. 7, the link mechanism 4 of the present embodiment includes a pair of link members 41, and a link portion 42. An upper end portion of each of the members 41 is supported at a lower portion of the fixing bracket 30 such that the link members 41 are rotatable about a pivot shaft P1. A lower end portion of each of the link members 41 is supported at a rear upper end portion of the link portion 42 such that the link members 41 are rotatable about a pivot shaft P2.

The link portion 42 is formed in a bell crank shape, and includes a pair of arm portions and a pair of leg portions. The link portion 42 is supported at a lower portion of the main housing 10 to be rotatable about a pivot shaft P3 in a manner that the main housing 10 is placed to fit between the arm portions. The link portion 42 is supported to be rotatable about a pivot shaft P4 in a manner that a nut member 50 is placed to fit between the leg portions of the link portion 42. The nut member 50 forms the drive mechanism 5 together with, for example, a threaded shaft 80, and is provided at a drive source of the electric tilt mechanism 3. The nut member 50 is referred to also as a tilt nut or a tilt slider.

As described above, when the nut member 50 moves in an axial direction of the threaded shaft 80 in response to the rotation of the threaded shaft 80 driven or actuated by an electric motor 60, the link portion 42 swings or pivots about the pivot shaft P3 and the link members 41 pivot about the pivot shaft P1, and the main housing 10 (and the outer tube 22, the inner tube 21, the upper shaft 1a and the steering wheel W) moves in the upper and lower direction of the vehicle. In the present embodiment, a speed reduction mechanism 70 is provided between the electric motor 60 (an output shaft of the electric motor 60) and the threaded shaft 80, and outputted rotation of the electric motor 60 is decelerated appropriately and then is transmitted to the threaded shaft 80.

Each of FIGS. 1 to 5 illustrates the first embodiment of the speed reduction mechanism 70 provided at the steering apparatus described above. The speed reduction mechanism 70 includes a worm gear 71 provided at an output shaft 61 of the electric motor 60, a screw gear 72 provided at the threaded shaft 80, and an idle gear 73 including screw teeth each meshing with the worm gear 71 and the screw gear 72. The rotation the output shaft 61 of the electric motor 60 is decelerated or speed-reduced by the worm gear 71 and the screw gear 72, and then the decelerated rotation is transmitted to the threaded shaft 80, while a direction of the rotation is the same as the output shaft 61 via the idle gear 73. The speed reduction mechanism 70 may be small in size.

Figure 6:
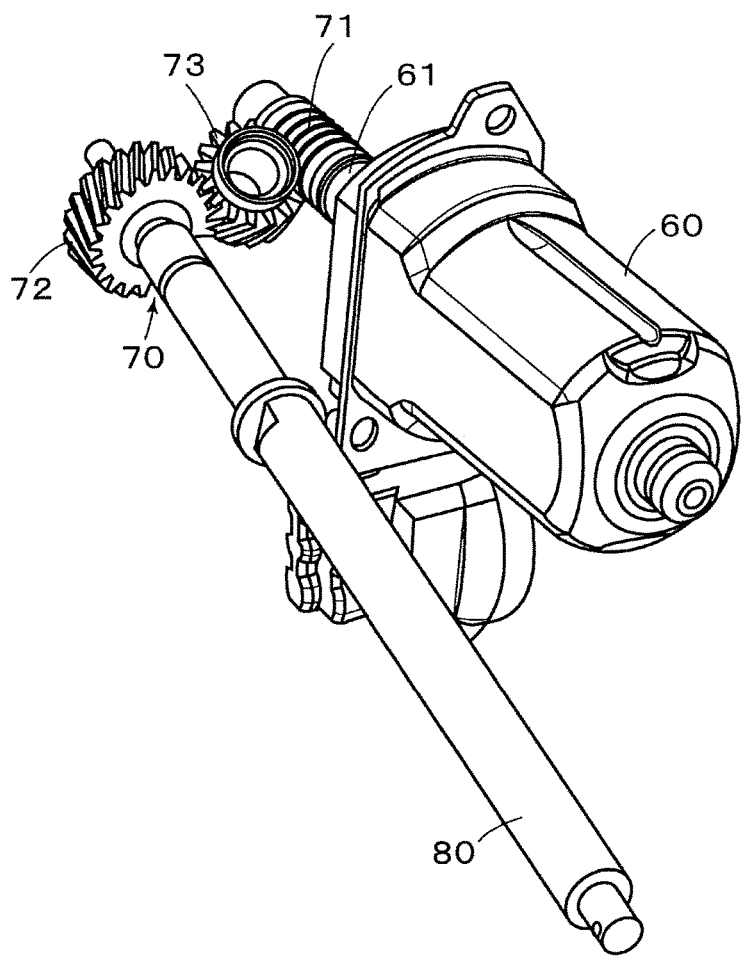
FIG. 6 is a perspective view illustrating a second embodiment of the speed reduction mechanism provided at the steering apparatus disclosed here.

In the present embodiment, trapezoidal screw threads (illustration of the thread grooves is omitted in the drawings) are formed on an outer circumferential surface of the threaded shaft 80 over the entire length in the axial direction, however, other type of external threads or outside screw may be used. In the present embodiment, the output shaft 61 of the electric motor 60 and the threaded shaft 80 are arranged to be parallel with each other. However, the output shaft 61 and the threaded shaft 80 may be connected to each other with a relationship of "inclination" or "tilt" so that the output shaft 61 and the threaded shaft 80 intersect each other at a predetermined angle as shown in FIG. 6. Alternatively, the output shaft 61 and the threaded shaft 80 may be connected to each other with a relationship of "skew" or "oblique" so that the output shaft 61 and the threaded shaft 80 do not intersect each other. In any of the cases, the output shaft 61 and the threaded shaft 80 are maintained by the speed reduction mechanism 70 in the corresponding relationship easily and appropriately, and therefore an appropriate transmission efficiency is ensured. In particular, by appropriately selecting the idle gear 73, a distance between the output shaft 61 and the threaded shaft 80, and a relative angle (the above-described predetermined angle) between the output shaft 61 and the threaded shaft 80 are adjustable to desired values.

At the speed reduction mechanism 70, when a helix angle of the idle gear 73 is A, a helix angle of the screw gear 72 is B, and a lead angle of the worm gear 71 is C, by setting the respective angles such that $A+2\times B+C=90$ degrees or $A+2\times B-C=90$ degrees is satisfied, the output shaft 61 and the threaded shaft 80 are arranged to be parallel with each other easily and appropriately, and therefore the appropriate transmission efficiency is ensured. That is, by setting the respective angles such that Helix angle of the idle gear 73+2×Helix angle of the screw gear 72+Lead angle of the worm gear 71=90 degrees or Helix angle of the idle gear 73+2×Helix angle of the screw gear 72−Lead angle of the worm gear 71=90 degrees is established, the output shaft 61 and the threaded shaft 80 are arranged to be parallel with each other easily and appropriately, and therefore the appropriate transmission efficiency is ensured. Specifically, in a case where it is set such that the helix angle of the idle gear 73 and the helix angle of the screw gear 72 are equal to each other (that is, A=B), even more appropriate transmission efficiency is ensured.

Figure 8:
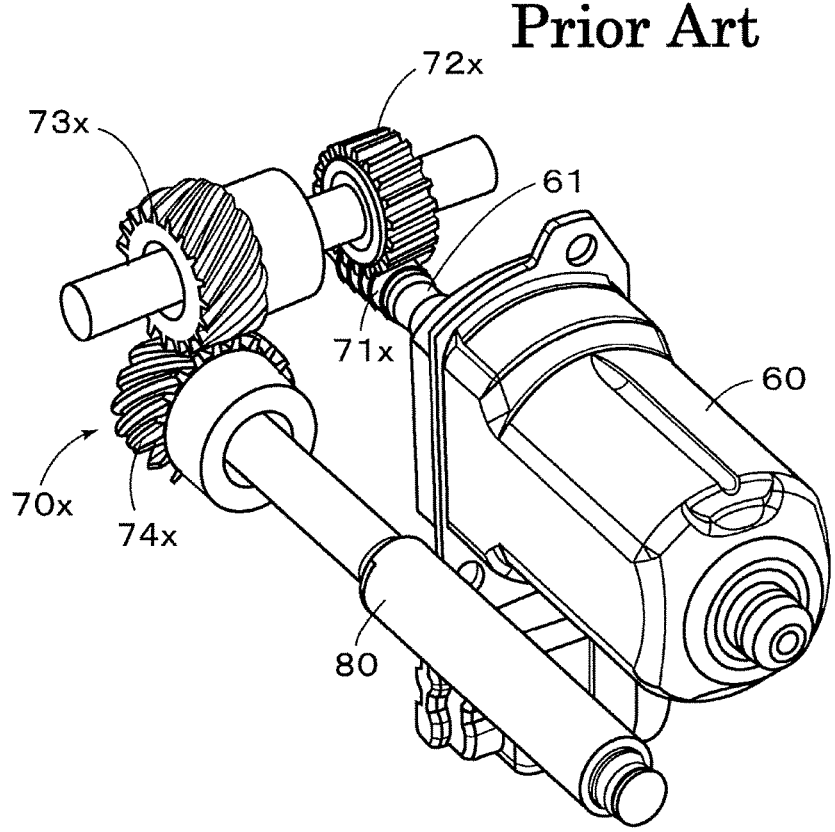
FIG. 8 is a perspective view illustrating an example of a speed reduction mechanism provided at a known steering apparatus.
Figure 9:
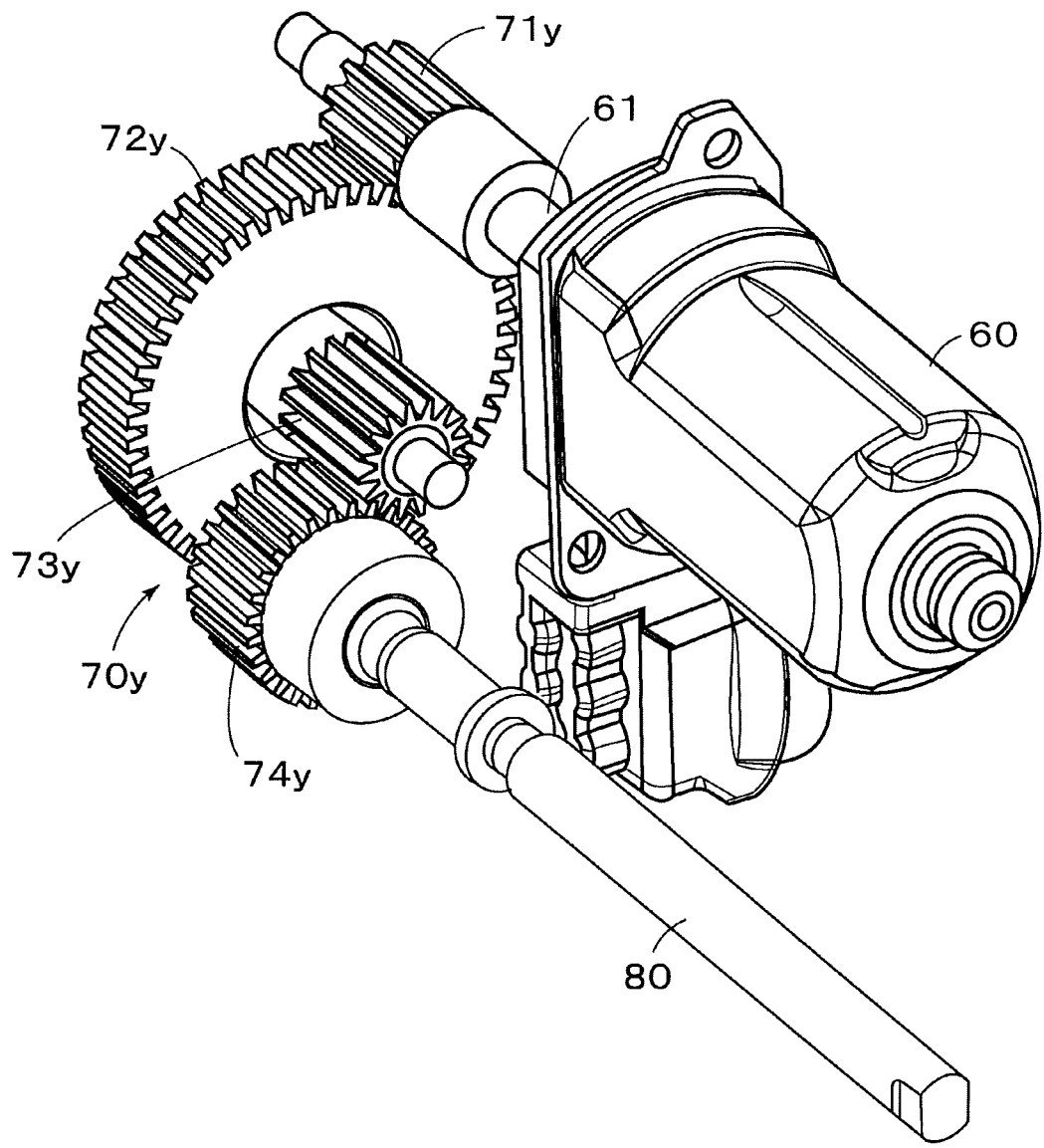
FIG. 9 is a perspective view illustrating another example of a speed reduction mechanism provided at a known steering apparatus.

FIG. 8 illustrates a known speed reduction mechanism 70x and FIG. 9 illustrates another known speed reduction mechanism 70y, which are to be compared with the speed reduction mechanism 70 of the present disclosure shown in FIGS. 1 to 5. As illustrated in FIGS. 8 and 9, each of the known reduction mechanisms 70x and 70y includes a large number of parts and components, and is large in size. The speed reduction mechanism 70x illustrated in FIG. 8 is formed by a worm gear 71x, a wheel gear 72x, and screw gears 73x and 74x. The speed reduction mechanism 70y illustrated in FIG. 9 is formed by four spur gears 71y, 72y, 73y and 74y. In addition, a relationship between the output shaft 61 of the electric motor 60 and the threaded shaft 80 of each of the known speed reduction mechanisms in FIGS. 8 and 9 is limited to the relationship of "parallelism", and the output shaft 61 and the threaded shaft 80 are not be able to connected to each other with the relationship of "inclination" as in the speed reduction mechanism 70 illustrated in FIG. 6 (or the output shaft 61 and the threaded shaft 80 are not be able to be connected to each other with the relationship of "skew"). The space-saving is limited in the known apparatuses because the relationships of "inclination" or "skew" are not conceivable in the known apparatuses.

The speed reduction mechanism 70 is applicable not only to the electric tilt mechanism 3 illustrated in FIG. 7 but also to the electric telescopic mechanism.

According to the aforementioned embodiments, the steering apparatus for a vehicle includes at least one of the electric telescopic mechanism 1, 10, 21, 22, W driving the steering wheel W provided at the steering shaft 1 such that the steering wheel W moves in the front and rear direction relative to the vehicle body B, and the electric tilt mechanism 3 driving the steering wheel W in the upper and lower direction. The one of the electric telescopic mechanism 1, 10, 21, 22, W and the electric tilt mechanism 3 includes the electric motor 60 supported by the steering shaft 1, the threaded shaft 80 connected to the output shaft 61 of the electric motor 60, the speed reduction mechanism 70 decelerating the rotation of the threaded shaft 80 relative to the rotation of the output shaft 61. The speed reduction mechanism 70 includes the worm gear 71 provided at the output shaft 61, the screw gear 72 provided at the threaded shaft 80, then idle gear 73 including the screw teeth meshing with the screw gear 72 and the worm gear 71, and the output shaft 61 and the threaded shaft 80 being connected to each other via the idle gear 73 such that at least one of the relationship of parallelism, the relationship of inclination and the relationship of skew is established between the output shaft 61 and the threaded shaft 80.

According to the above-described configuration, the reduction mechanism 70 decelerating the rotation of the threaded shaft 80, which connected to the output shaft of the electric motor 60, relative to the rotation of the output shaft 61 includes the worm gear 71 provided at the output shaft 61, the screw gear 72 provided at the threaded shaft 80 and the idle gear 73 including the screw teeth meshing with each of the screw gear 72 and the worm gear 71. The output shaft 61 and the threaded shaft 80 are connected to each other via the idle gear 73 such that at least one of the relationship of parallelism, the relationship of inclination and the relationship of skew is established between the output shaft 61 and the threaded shaft 80. Consequently, the output shaft 61 and the threaded shaft 80 are maintained in the aforementioned relation simply and appropriately, thereby assuring the appropriate transmission efficiency. In particular, by appropriately choosing the idle gear 73, the distance and the relative angle between the output shaft 61 and the threaded shaft 80 can be adjusted to the desired value.

According to the aforementioned embodiment, at the speed reduction mechanism 70, the idle gear 73 includes the helix angle corresponding to A, the screw gear 72 includes the helix angle corresponding to B, and the worm gear 71 includes the lead angle corresponding to C, and the speed reduction mechanism 70 is configured such that $A+2\times B+C=90$ degrees or $A+2\times B-C=90$ degrees is satisfied.

According to the above-described configuration, where the helix angle of the idle gear 73 is A, the helix angle of screw gear 72 is B, and the lead angle of the worm gear 71 is C, by setting $A+2\times B+C=90$ degrees or $A+2\times B-C=90$ degrees, the output shaft 61 and the threaded shaft 80 can be arranged to be parallel with each other easily and appropriately, and therefore the appropriate transmission efficiency is ensured.

According to the aforementioned embodiment, the helix angle of the idle gear 73 and the helix angle of the screw gear 72 are set to be equal to each other.

According to the above-described configuration, the helix angle of the idle gear 73 and the helix angle of the screw gear 72 are set to be equal to each other, and consequently even more appropriate transmission efficiency is ensured.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering apparatus for a vehicle, the apparatus comprising:
    at least one of an electric telescopic mechanism driving a steering wheel provided at a steering shaft such that the steering wheel moves in a front and rear direction relative to a vehicle body, and an electric tilt mechanism driving the steering wheel in an upper and lower direction;
    the one of the electric telescopic mechanism and the electric tilt mechanism including:
        an electric motor supported by the steering shaft;
        a threaded shaft connected to an output shaft of the electric motor;
        a speed reduction mechanism decelerating rotation of the threaded shaft relative to rotation of the output shaft; and
    the speed reduction mechanism including:
        a worm gear provided at the output shaft;
        a screw gear provided at the threaded shaft;
        an idle gear including a screw tooth meshing with the screw gear and the worm gear; and
    the output shaft and the threaded shaft being connected to each other via the idle gear such that at least one of a relationship of parallelism, a relationship of inclination and a relationship of skew is established between the output shaft and the threaded shaft wherein
    at the speed reduction mechanism, the idle gear includes a helix angle corresponding to A, the screw gear includes a helix angle corresponding to B, and the worm gear includes a lead angle corresponding to C, and
    the speed reduction mechanism is configured such that $A+2\times B+C=90$ degrees or $A+2\times B-C=90$ degrees is satisfied.

2. The steering apparatus for a vehicle according to claim 1, wherein the helix angle of the idle gear and the helix angle of the screw gear are set to be equal to each other.

* * * * *